Feb. 4, 1964

ENO KATSUFUMI 3,120,288

COMPUTING SCALE MECHANISM

Filed April 3, 1961

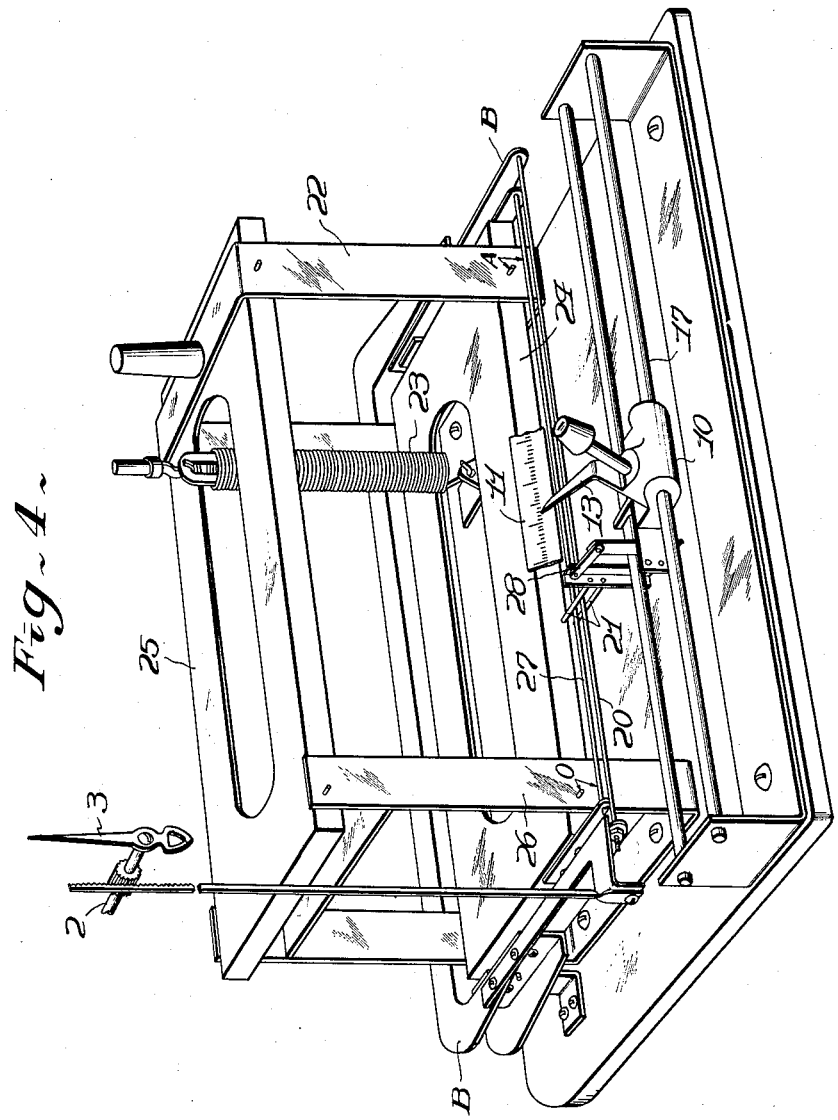

United States Patent Office 3,120,288
Patented Feb. 4, 1964

3,120,288
COMPUTING SCALE MECHANISM
Katsufumi Eno, 1163 Ushida-machi,
Hiroshima-shi, Japan
Filed Apr. 3, 1961, Ser. No. 100,294
Claims priority, application Japan June 10, 1960
4 Claims. (Cl. 177—26)

This invention relates to so-called computing weighing scales of the type wherein the weight of an object as well as a variable which is a function of the weight, for example, the price of the said object, are indicated, and more particularly the invention relates to a novel computing mechanism enabling the indication of both weight and the weight-variable function on the same calibration scale, but not simultaneously, and to a mechanism for switching the said computing mechanism between its two conditions of indicating weight and of indicating the weight-variable function.

Among the conventional weighing scales of the computing type known heretofore, one type has had two calibrated scales for weight and monetary value and two indicating pointers, and another type has had one indicating pointer moving over two non-uniform calibrated scales for weight and monetary value. These weighing scales, however, have had various disadvantages, such as the possibility of visual confusion and errors and difficulty in reading the scales due to the complex nature of their mechanisms and calibrated scales.

It is an essential object of the present invention, therefore, to provide a novel mechanism for weighing scales of this type, wherein the disadvantages accompanying the conventional weighing scales of this type are eliminated.

It is another object of the invention to provide a mechanism as stated above, which has one uniform scale and one indicating pointer whereby both weight and a function of the weight can be read easily.

It is a further object of the invention to provide a switching mechanism whereby the mechanism stated above can be selectively switched to indicate directly either the weight or the variable which is a function of the weight.

By way of example for the purpose of illustration, the variable which is a function of the weight shall be referred to hereinafter as the "price."

The manner in which the foregoing objects, other objects, and advantages of the invention may best be achieved will be understood more fully from a consideration of the following description, taken in conjunction with the accompanying illustrations in which the same and equivalent parts are designated by the same reference numerals or letter, and in which:

FIG. 4 is a perspective view, with certain parts cut away, showing the principal parts of a computing scale provided with the mechanism of the present invention.

Figure 1:
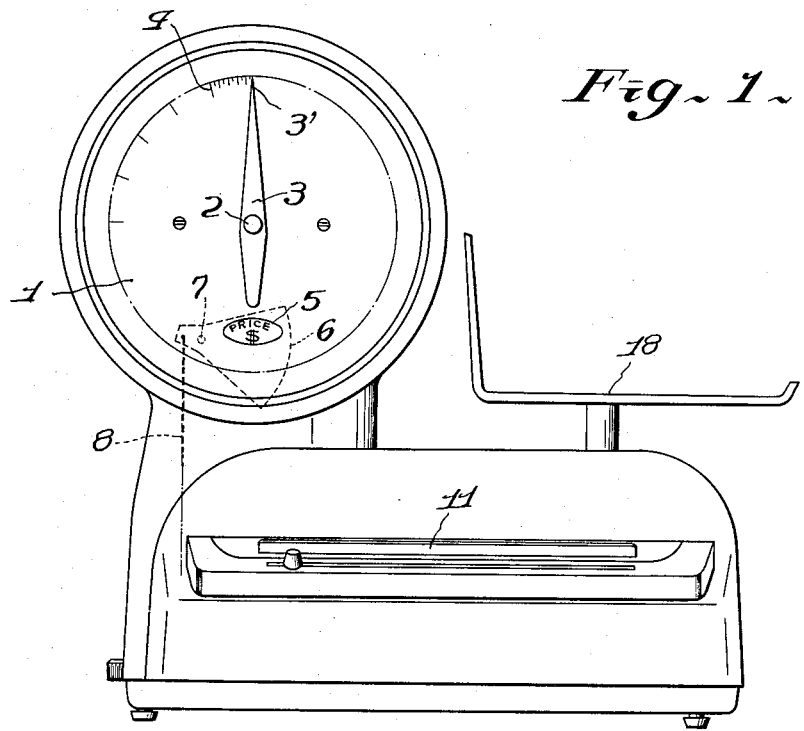
FIG. 1 is an elevational view, from the operator's side, of a computing scale provided with the mechanism of the present invention.

Referring to the drawings, in the center of a calibration plate 1 of a computing scale, is installed a shaft 2 which can be made to rotate proportionally to the weight of an object being measured, and which can also be made to rotate proportionally to the unit price and weight of the said object. An indicating pointer 3 is fixed to the said shaft 2, and a uniformly calibrated scale 4 is inscribed on the surface of the calibration plate 1 so as to lie in the path of rotation of the extreme tip 3' of the pointer 3. The said scale 4 has no designation of unit (unit of weight or unit of monetary value). Instead, the variable and unit being indicated by the pointer 3 on the scale 4 is designated by a designator 6, visible at some suitable position on the scale body, for example, through a window 5. The mechanism of the present invention is so adapted as to enable switching of the scale mechanism between weight indication and price indication and to designate the variable and unit being indicated on the scale 4 in such a manner that when the scale mechanism is switched so as to cause the pointer 3 to rotate proportionally to the weight of the object being measure, this condition is designated by the designator 6 at the window 5, and when the scale mechanism is switched so as to cause the pointer 3 to rotate proportionally to the product of the unit price and weight of the said object, this condition is designated by the designator 6.

The means for actuating the designator 6 may be any of known, reliable mechanisms. In the example means illustrated, the designator 6 is a substantially sector-shaped plate with designations of weight and a weight unit and of monetary value and monetary unit inscribed thereon. The said plate is pivoted about a pivot 7 fixed to a portion of the scale body structure and is actuated in rotational motion by a movement transmitting means such as a cord 8, as shown, or a mechanical linkage consisting of crank levers and connecting rods. The said movement transmitting means is actuated by a lever 9, which is actuated in turn by a push member 14 fixed to a sliding member 10 for unit price setting when the said sliding member is placed in its position for causing the pointer 3 and the scale 4 to indicate weight.

The aforesaid sliding member 10 is supported on and slides on one or more slide bars 17 mounted rigidly onto the scale body structure and supports a unit-price pointer 13, which indicates over a unit-price calibration scale 11' up to a weight line 12 at the right end. The said scale 11' and line 12 are inscribed on a calibration plate 11, which, in cooperation with the pointer 13, indicates the condition of indication of weight only or the condition of a proportionally computing mechanism, as indicated in FIGS. 3 and 4, of the pointer 3 when the said pointer 3 is to rotate proportionally to the product of the unit price and weight of an object being measured.

When the aforesaid sliding member 10 is brought to a position such that the pointer 13 coincides with the weight line 12, the push member 14 pushes on and actuates the designator 6 through the lever 9 and the movement transmitting means, as was described before to designate weight indication. Simultaneously, the sliding member 10 is locked in this weight indication position by a locking device such as that illustrated consisting of a lock notch 15 and a lock tooth mounted on a lock spring plate 16.

If, with the sliding member 10 locked in this weight indication position, an object to be weighed (not shown) is placed on the weighing platform 18 of the scale, the pointer 3 will rotate proportionally to the magnitude of the weight of the said object and indicate the said weight on the calibration scale 4. If the sliding member 10 is then moved leftward, as viewed in the illustrations, to a position where the unit-price pointer 13 is coincident with a position corresponding to the unit price of the object being measured on the unit-price calibration scale 11', the proportionally computing mechanism will be placed in the condition wherein it will cause the pointer 3 to rotate in proportion to the product of the weight and unit price of the object being measured. Accordingly, the pointer 3 will indicate, on the scale 4, the product of the weight and unit price, that is, the total price value of the object being measured. On one hand, the aforesaid push member 14 will retract from its position where it has been pushing on the lever 9. Accordingly, the designator will be released, so that it will return to its original position by gravitational force and designate price indication.

Figure 3:
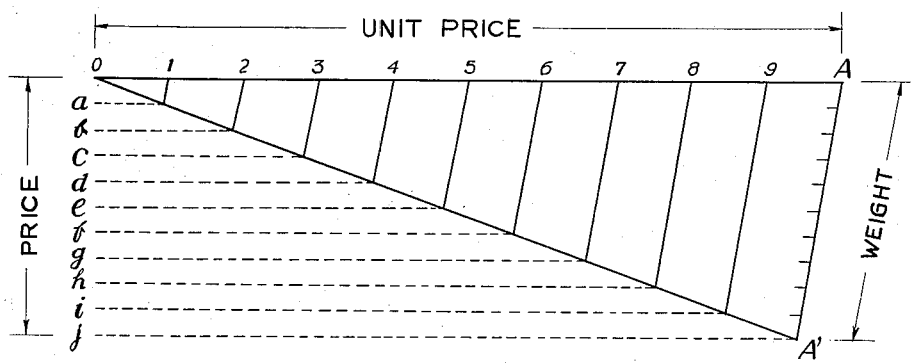
FIG. 3 is a graphical representation for illustrating the principle utilized in the invention.

The aforementioned proportionally computing mechanism, which is connected to the mechanism for actuating the pointer 3 and to the unit price setting mechanism, may be exemplified by the proportionally computing mechanism indicated in FIG. 4, the principle of which is illustrated graphically in FIG. 3. The weighing mechanism of the scale mechanism shown in FIG. 4 is essentially of the known four-bar, parallelogram linkage type. The linkage comprises mutually opposite and parallel members 24 and 25, and mutually opposite and parallel members 22 and 26. Member 26 is rigidly fixed in vertical position to the scale base or frame. The remaining members 24, 25, and 22 are free to move in combination as the intervening linkage to cause the weight of the object on the platform 18 to be balanced by the counter force of a coil spring 23 having proportional relation between its elongation and spring force.

The member 24 is pivoted on the member 26 at a point 0. Accordingly, its motion, or deflection, is rotational with the point 0 as the center of rotation. Moreover, within the relatively small range of displacement of the member 24 employed in the intended use of this scale, the displacement of the said member 24 with respect to the base or frame of the scale is proportional to the weight of the object being weighed.

Referring to FIG. 3, the line 0A corresponds to the portion between the pivots 0 and A of the member 24 in FIG. 4, the point A being coincident with axis of rotatable connection between the members 22 and 24. The rotational displacement of the member 24 of FIG. 4 in proportion to the weight of the object being weighed may be represented as shown in FIG. 3 by the displacement of the line 0A, uniformly in proportion to the said weight, to a limiting position 0A'. The line 0A, for the purpose of illustration, is divided into ten equal divisions by points 1, 2, 3, . . . 9. It will be apparent that each of these points is also displaced in direct proportion to the said weight but at a rate which is in proportion to its distance from 0. By reason of geometry, the vertical displacements 0a, 0b, 0c, . . . 0j are also in proportion to the said weight. That is, $$\frac{0a}{0_1}=\frac{0b}{0_2}=\frac{0c}{0_3}= \cdots \frac{0j}{0A}$$

If the graduation scale 0, 1, 2, 3 . . . A is adapted to represent the unit price of the article being measured, it will be possible to indicate the total price value of the said article by the graduation scale 0, a, b, c . . . j. That is, since the ten uniform graduations of AA' (ten uniform graduations of weight) are proportional to the ten uniform graduations 0, a, b, c, . . . j of 0j based on the ten uniform graduations of the line 0A, these graduations can be indicated by a single pointer. In other words, the rate of proportionality between the weight and vertical displacement caused thereby of a point on the line 0A depends on the horizontal position of said point, varying linearly from zero at 0 to unity at A.

The above-described principle is utilized in the mechanism of FIG. 4. A frame B which is free to rock pivotally on pivots rigidly supported on the scale base, and which drives a mechanism for actuating the pointer 3, supports a straight follower rod 20, which is free to move up and down while maintaining constant angle with respect to the scale base. A similar straight rod 27 is integrally fixed to the aforesaid member 24 and provides a physical simulation of the line 0A of FIG. 3. A leveling device 21 which is in sliding contact above and below both of the rods 20 and 27, and which is supported by a four-bar, parallelogram linkage 28 so as to have freedom of vertical motion, follows the vertical displacement of the rod 27 and transmits the said vertical displacement directly to the rod 20. The linkage 28 is supported on the sliding member 10 described before on which the unit price pointer 13 is attached. The horizontal position of the device 21 with respect to the position of the interval 0A on the rod 27 is indicated by the pointer 13 on the unit price graduation scale 11.

It will be seen that, in the mechanism as described above, by setting the unit price pointer 13 at the appropriate graduation on the scale 11, the level device 21 is set at the corresponding horizontal position with respect to 0A, whereby the vertical displacement of the rod 27 at the said horizontal position of the device 21 is thereby transmitted directly to the rod 20. The resulting vertical displacement, now computed for the unit price, is transmitted by way of a movement transmitting means to cause movement of the pointer 3 according to the set unit price and in proportion to the weight of the object being measured.

Figure 2:
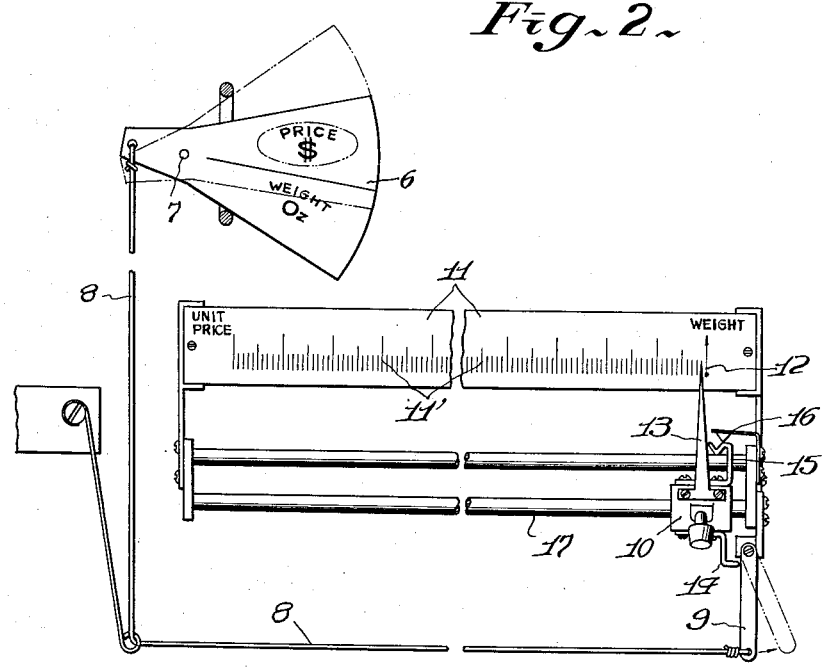
FIG. 2 is a schematic diagram illustrating a correlated motion mechanism of the invention.

When the weight of the object being measured is to be indicated, the sliding member 10 is moved manually to the extreme right end and locked, as described before, thereby causing the pointer 13 to move to the right to coincide with the aforesaid line 12 (FIG. 2) and the leveling device 21 to be coincident with the point on the rod 27 directly in line with the axial point A. The computing mechanism is now set to indicate the weight directly, as designated by the designator 6.

Since, in the mechanism of the present invention as described above, only one calibration scale of uniform graduations is used commonly for both weight indication and price indication with appropriate interchange of the units of the said calibrated scale and designation of the applicable unit in each case, the two units are clearly distinguishable from one another, and the possibility of confusion or errors in reading is eliminated.

Although this invention has been described with respect to a particular embodiment thereof, it is not to be so limited as changes and modifications may be made therein which are within the full intended scope of the invention, as defined by the appended claims.

I claim:

1. In a weighing scale of the type including a four bar link means having a first vertical bar, a pair of parallel bars extending generally horizontally and a second vertical bar that is spring suspended so that its vertical displacement is proportional to a load supported thereby, and means on said second vertical bar to support an object to be weighed, an actuator rod parallel to said pair of bars, said actuator rod at one end pivoting about a stationary point in the plane of said first vertical bar and having its other end mounted to move with said second vertical bar so that said actuator rod moves in a vertical plane pivoted at one end, a horizontal follower rod lying in a vertical plane closely adjacent the plane of said actuator rod, said follower rod being movable vertically parallel to itself, indicator means operatively connected to said follower rod, and selecting means movable horizontally adjacent said follower rod adapted to couple said actuator rod to said follower rod at a point of their lengths to restrain said actuator rod and said follower rod against relative movement at a point of their lengths determined by the location of said selecting means, whereby upon downward movement of said second vertical bar under the influence of an object to be weighted the indicator is moved proportionally to the weight of an object to be weighed and proportionately to the selected position of said selecting means, to give a reading expressed in units determined by the position of said selecting means.

2. In a weighing scale of the type in which an element is displaced a distance proportional to the weight of an article being weighed, a computing mechanism comprising a straight actuator rod fixed to a moving member of said weighing mechanism at one end and secured at the other end to pivot about a fixed point so that the actuator rod is movable in a vertical plane to swing up and down under the influence of an article to be weighed, a calibrated indicator, a calibrated indicator actuating mechanism consisting of a movable device capable of being adjustably moved substantially alongside the length of said actuator rod for following the pivotal movement of any longitudinal point of said actuator rod to transmit said movement to said mechanism for actuating said calibrated indicator, a suitable scale positioned adjacent said indicator whereby a movement proportional to the movement of said longitudinal point of said actuator rod is transmitted to the calibrated indicator, whereby indication of either the weight of an object to be weighed or a value expressed in units other than weigh proportional to said weight is indicated on said scale.

3. The computing mechanism according to claim 2, wherein said actuating mechanism for actuating the calibrated indicator includes a frame, a follower rod which is supported by said frame, said frame being pivoted about horizontal pivots to position said follower rod to lie substantially alongside said actuator rod and to be freely movable up or down, said mechanism comprising a leveling device in sliding contact with both said actuator rod and said follower rod, whereby the portions of both rods with which it is in contact move vertically in unison, said leveling device mounted with freedom of vertical movement, a horizontal straight guide along which said leveling device may be moved, and a pointer for indication of the position of said leveling device to determine the units in which the scale is to be read.

4. A mechanism for use with the combination of claim 3 adapted for designating both the state in which the calibrated indicator is actuated to determine the weight of the article to be weighed and the state in which said indicator is actuated to indicate the product of the unit price and the weight of said article, said mechanism comprising a viewing window, a designator capable of being viewed through said window, and means to move said designator operated by movement of said leveling device to its extreme position in one direction to move said designator to a position to indicate that the units of the indications are to be read as units of weight and by movement from said extreme position to indicate that the units of the indicator are to be read as units of value.

References Cited in the file of this patent
UNITED STATES PATENTS

| | | |
|---|---|---|
| 762,136 | Camper | June 7, 1904 |
| 1,324,151 | Hem | Dec. 9, 1919 |
| 1,499,776 | Hem | July 1, 1924 |